United States Patent
Mohan

(10) Patent No.: US 10,740,146 B2
(45) Date of Patent: Aug. 11, 2020

(54) MIGRATING VIRTUAL MACHINES BETWEEN COMPUTE SYSTEMS BY TRANSMITTING PROGRAMMABLE LOGIC ACCELERATOR STATE

(71) Applicant: Xilinx, Inc., San Jose, CA (US)

(72) Inventor: Sundararajarao Mohan, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 285 days.

(21) Appl. No.: 15/430,231

(22) Filed: Feb. 10, 2017

(65) Prior Publication Data
US 2018/0232254 A1    Aug. 16, 2018

(51) Int. Cl.
G06F 9/48    (2006.01)
G06F 3/06    (2006.01)
(Continued)

(52) U.S. Cl.
CPC ............ *G06F 9/4856* (2013.01); *G06F 3/061* (2013.01); *G06F 3/0632* (2013.01);
(Continued)

(58) Field of Classification Search
CPC ...... G06F 9/4856; G06F 9/5077; G06F 9/461; G06F 3/0664; G06F 3/0632;
(Continued)

(56) References Cited

U.S. PATENT DOCUMENTS 8,103,992 B1 *   1/2012   Chan ................... G06F 17/5054
                                                           716/100
9,619,265 B2 *   4/2017   Kruglick ............. G06F 9/45558
(Continued)

FOREIGN PATENT DOCUMENTS

EP           3089035        11/2016
WO        20140209286      12/2014

OTHER PUBLICATIONS

U.S. Appl. No. 15/367,611, filed Dec. 2, 2016, Xilinx, Inc., San Jose, CA USA.
(Continued)

*Primary Examiner* — Meng Ai T An
*Assistant Examiner* — Michael W Ayers
(74) *Attorney, Agent, or Firm* — Patterson + Sheridan, LLP

(57) ABSTRACT

Embodiments herein describe techniques for executing VMs on hosts that include an accelerator. The hosts can use the accelerators to perform specialized tasks such as floating-point arithmetic, encryption, image processing, etc. Moreover, VMs can be migrated between hosts. To do so, the state of the processor is saved on the current host thereby saving the state of the VM. For example, by saving the processor state, once the data corresponding to the VM is loaded into a destination host, the processor can be initialized to the saved state in order to resume the VM. In addition to saving the processor state, the embodiments herein save the state of the accelerator on a FPGA. That is, unlike previous systems where tasks executed by the accelerator are discarded when migrating the VM, the state of the accelerator can be saved and used to initialize an FPGA accelerator in the destination host.

18 Claims, 6 Drawing Sheets

(51) Int. Cl.
  *G06F 12/10* (2016.01)
  *G06F 13/30* (2006.01)
  *G06F 9/50* (2006.01)
  *G06F 9/46* (2006.01)
  *G06F 13/40* (2006.01)

(52) U.S. Cl.
  CPC .......... *G06F 3/0647* (2013.01); *G06F 3/0664* (2013.01); *G06F 3/0683* (2013.01); *G06F 9/5077* (2013.01); *G06F 12/10* (2013.01); *G06F 13/4027* (2013.01); *G06F 9/461* (2013.01); *G06F 2212/65* (2013.01)

(58) Field of Classification Search
  CPC ...... G06F 3/0647; G06F 3/061; G06F 3/0683; G06F 12/10; G06F 13/4027; G06F 2212/65
  See application file for complete search history.

(56) References Cited

U.S. PATENT DOCUMENTS

| | | | |
|---|---|---|---|
| 9,698,794 B1* | 7/2017 | Fender | H03K 19/1776 |
| 2010/0146202 A1* | 6/2010 | Nystad | G06F 21/123 |
| | | | 711/108 |
| 2011/0084973 A1* | 4/2011 | Masood | G06T 1/20 |
| | | | 345/506 |
| 2012/0054771 A1 | 3/2012 | Krishnamurthy et al. | |
| 2014/0019729 A1* | 1/2014 | Pell | G06F 15/8053 |
| | | | 712/225 |
| 2014/0157287 A1 | 6/2014 | Howes et al. | |
| 2015/0301585 A1* | 10/2015 | Noro | G06F 1/3243 |
| | | | 345/502 |
| 2016/0139944 A1* | 5/2016 | Rouwet | G06F 9/45558 |
| | | | 718/1 |
| 2016/0247248 A1* | 8/2016 | Ha | G06F 9/455 |
| 2018/0004564 A1* | 1/2018 | Konishi | G06F 9/5016 |

OTHER PUBLICATIONS

U.S. Appl. No. 15/334,182, filed Oct. 25, 2016, Xilinx, Inc., San Jose, CA USA.

* cited by examiner

MAPPING
600

| GRAPHICS ACCELERATOR | | |
|---|---|---|
| FPGA TYPE A | FPGA TYPE B | FPGA TYPE C |
| REGISTER X2, Y4 | REGISTER X1, Y5 | REGISTER X5, Y1 |
| REGISTER X6, Y1 | REGISTER X7, Y2 | REGISTER X3, Y4 |
| ⋮ | ⋮ | ⋮ |
| REGISTER X1, Y3 | REGISTER X4, Y3 | REGISTER X2, Y5 |

FIG. 6

MIGRATING VIRTUAL MACHINES BETWEEN COMPUTE SYSTEMS BY TRANSMITTING PROGRAMMABLE LOGIC ACCELERATOR STATE

TECHNICAL FIELD

Examples of the present disclosure generally relate to migrating virtual machines and, in particular, to saving a state of a field-programmable gate array (FPGA).

BACKGROUND

Virtual machines (VMs) can be migrated between different computing systems (referred to herein as hosts). When migrating a VM, memory, storage, and network connectivity of the VM are transferred from the original host to the destination host. In a pre-copy memory migration, a hypervisor (i.e., the interface between the VM and the host hardware) typically copies the memory pages from the current host to the destination host while the VM continues to execute on the host. In a post-copy memory migration, the VM is suspended at the source. While the VM is suspended, a minimal subset of the execution state of the VM (CPU state, registers and, optionally, non-pageable memory) is transferred to the destination host. The VM is then resumed on destination host. Although the VM is now executing on a different host, to the perspective of the user, there may be no change except the VM may have been unavailable while being migrated (if the VM was paused).

Many hosts use accelerators to perform specialized functions such as graphics processing, cryptography, image processing, and the like. These accelerators include hardware elements that can be separate from the processors in the host. For example, the accelerators may be disposed on one or more FPGAs mounted in the host. When executing applications in the VM, the host may offload some of the processing tasks assigned to a processor to an accelerator which then performs the tasks and returns the processed data to the processor. However, when migrating VMs, any tasks currently being performed by the accelerators are lost. Thus, the new host has to restart the task when resuming the migrated VM.

SUMMARY

Techniques for migrating an accelerator are described. In one example is a computing system that includes a first processor, a migration tool configured to save a state of the first processor and a state of a first accelerator to migrate a VM operating in the computing system, and a first programmable integrated circuit (IC). The programmable IC is configured to selectively stop a clock controlling the execution of the first accelerator, wherein the first accelerator is implemented using programmable logic in the programmable IC and, after stopping the clock, return a saved state of the first accelerator to the migration tool to migrate the VM.

One example described herein is a programmable IC that includes an I/O interface configured to communicatively couple the programmable IC to an external processor, a programmable logic array implementing an accelerator configured to execute a task corresponding to a VM, and a bridge communicatively coupled between the I/O interface and the programmable logic array. The bridge is configured to selectively stop a clock controlling the execution of accelerator in response to a request to migrate the VM. Moreover, the programmable IC includes a state retriever configured to return a saved state of the accelerator after the clock has stopped.

One example described herein is a method that includes saving a state of the first accelerator in a first programmable IC, wherein the first accelerator executes a task for the VM where the first programmable IC is disposed in a first compute system. The method includes transmitting the state of the first accelerator to a second compute system, initializing a second accelerator in a second programmable IC based on the state of the first accelerator where the second programmable IC is disposed in the second compute system, and executing the VM in the second compute system after initializing the second accelerator in the second programmable IC.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 6 illustrates a mapping of an accelerator to different FPGA architectures according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
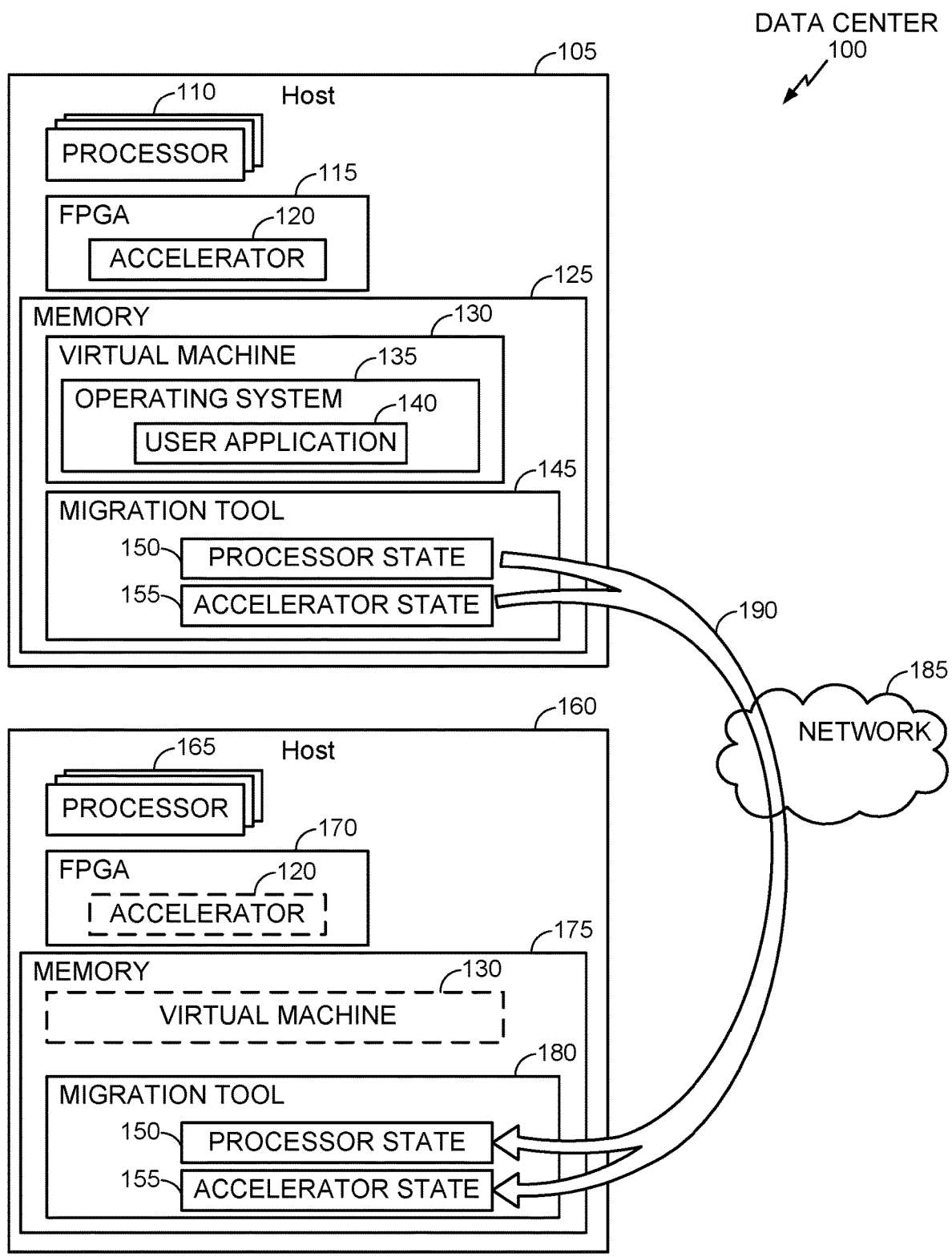
FIG. 1 is a block diagram of migrating a VM between hosts, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for executing VMs on hosts that include an accelerator. The hosts may use the accelerators to perform specialized tasks such as floating-point arithmetic, encryption, image processing, and the like. The accelerators can typically perform these tasks faster than processors. In one embodiment, when a processor assigns a task to an accelerator, the accelerator can perform the task independent of the processor which frees the processor to perform other tasks. Once the accelerator has finished, the processed data is sent to the processor. In turn, the processor may transmit the processed data to an application executing in the VM.

As discussed above, VMs can be migrated between hosts. To do so, the state of the processor is saved on the current host which saves the state of the VM. For example, by saving the processor state, once the data corresponding to the VM is loaded onto a destination host, the processor can be initialized to the saved state in order to resume the VM. In addition to saving the processor state, the embodiments herein save the state of the accelerator on the FPGA (or other type of programmable intergrated circuit (IC)). That is, unlike previous systems where tasks executed by the accelerator are discarded when migrating the VM, the state of the accelerator can be saved and used to initialize an accelerator on an FPGA in the destination host.

In one embodiment, a data center performs a compatibility check to determine that the FPGA in the destination host is compatible with the accelerator in the current host. Even if the FPGA is compatible, the destination host may perform a mapping operation to map values of memory elements in the same accelerator state to the architecture of the FPGA in the destination host. For example, the register values in the accelerator state may correspond to different portions of the programmable logic in the destination FPGA than in the source FPGA. Thus, before initializing the accelerator on the destination FPGA, the host identifies the registers in the destination FPGA that correspond to the registers values saved in the accelerator state.

FIG. 1 is a block diagram of migrating a VM 130 between hosts, according to an example. As shown, FIG. 1 illustrates a data center 100 that includes a source host 105 that is currently executing the VM 130 and a destination host 160 to which the VM 130 is being migrated. The source host 105 includes one or more processors 110, an FPGA 115, and memory 125. The processors 110 represent one or more separate processing elements that each may include one or more processing cores. In one embodiment, the processors 110 are central processing units for the host 105 tasked with executing tasks or instructions issued by the VM 130.

The FPGA 115 contains programmable logic that is configured to implement an accelerator 120 such as a graphics accelerator, encryption accelerator, and the like. Although the embodiments herein specifically describe a FPGA, the techniques and circuitry described below can be applied to any type of programmable IC such as a system-on-a-programmable-chip or complex programmable logic devices. Instead of executing all the instructions issued by the VM 130, the processors 110 may delegate specialized tasks to the accelerator 120 such as floating-point arithmetic, encryption, image processing, and the like. The accelerator 120 completes the tasks and then passes the processed data (or a pointer to the processed data in the memory 125) to the processor 110. While the accelerator 120 is performing the task, the processor 110 is free to perform other instructions.

The VM 130 includes an operating system 135 which executes a user application 140. The operating system 135 can be any operating system capable of performing the functions described herein. Further, the user application 140 can be any program for performing a task or service, e.g., a web server, a database, an image processing tool, a file transfer system, etc. In one embodiment, the accelerator 120 executes specialized tasks issued by the user application 140 such as rendering video, encrypting/decrypting files, or performing complicated arithmetic.

The memory 125 includes a migration tool 145 for saving the state of VM 130 so that the VM 130 can be migrated from the source host 105 to the destination host 160. Although as shown as an application stored in the memory 125, in other embodiments, the migration tool 145 may be stored in a separate computing system in the data center 100. For example, the migration tool 145 may be part of a central controller in the data center 100 that decides when to migrate VMs between hosts in the data center 100.

To migrate the VM 130, the migration tool 145 saves a processor state 150 and an accelerator state 155. The processor state 150 represents the values of various memory elements in the processor(s) 110 at a particular time. For example, if performing a post-copy memory migration, the migration tool 145 saves the state of the registers in the processors 110 when the VM 130 is suspended to generate the processor state 150. If performing a pre-copy memory migration, the migration tool 145 may save the processor state 150 after all, or most of, the memory corresponding to the VM 130 has been transferred to the destination host 160. Regardless of the migration technique used, the processor state 150 includes the necessary data for executing the VM 130 in a different host in the same state the VM 130 was in while executing on the source host 105. For example, if the processor 110 is currently executing a task for the user application 140, the processor state 150 includes information for initializing a processor 165 in the destination host 160 such that the processor 165 can begin executing the task where the processor 110 left off.

The migration tool 145 also generates the accelerator state 155 that represents the values of various memory elements in the accelerator 120 at a particular time. As described in more detail below, the FPGA 115 includes hardware elements that permit the migration tool 145 to stop the accelerator 120 by stopping a clock for the accelerator 120. Even though the accelerator 120 is stopped, the migration tool 145 can access an I/O interface in the FPGA 115 and retrieve the values of memory elements (e.g., registers and flip flops) in the accelerator 120. Using these values, the data center 100 can initialize an accelerator in the destination host 160 to the same state as the accelerator 120. Thus, if the accelerator 120 is performing a task for the VM 130, an accelerator in the destination host 160 can be initialized to the same state as accelerator 120 so that the task does not need to be restarted.

The data center 100 includes a network 185 which the migration tool 145 uses to transfer the processor state 150 and the accelerator state 155 to the destination host 160. The destination host 160 includes one or more processors 165 which represent one or more processing elements that can include any number of processing cores. For example, the destination host 160 may include the same or a different number of processors 165 than the current host 105.

The host 160 also includes an FPGA 170, memory 175, and a migration tool 180. As shown by arrow 190, the migration tool 180 receives the processor state 150 and the accelerator state 155 from the migration tool 145 in the source host 105. Using the information contained therein, the destination host 160 initializes the processors 165 to be in the same state as the processors 110. As shown by the dotted lines, the host 160 uses the accelerator state 155 to initialize the accelerator 120 in the FPGA 170. In this embodiment, the FPGA 170 may not include an currently operating accelerator before the destination host 160 uses the accelerator state 155 to configure the programmable logic in the FPGA 170 to implement the accelerator 120 in the same state as the accelerator 120 in the current host 105.

However, in another embodiment, the FPGA 170 may already have an operational accelerator which is the same type as the source accelerator—e.g., the accelerator 120 in FPGA 115. In that case, the host 160 may initialize the accelerator to be in the same state as accelerator 120 in the FPGA 115 using the accelerator state 155.

Once the processors 165 and the accelerator 120 are initialized, the dotted lines illustrate that the VM 130 is now ready to begin executing on the destination host 160. In one embodiment, the VM 130 is resumed in the same state as when the VM 130 was executing on the source host 105. For example, to the perspective of the user, the VM 130 may temporary pause (or slow down) while migrating, but otherwise is in the same state when moving from the host 105 to the host 160.

Figure 2:
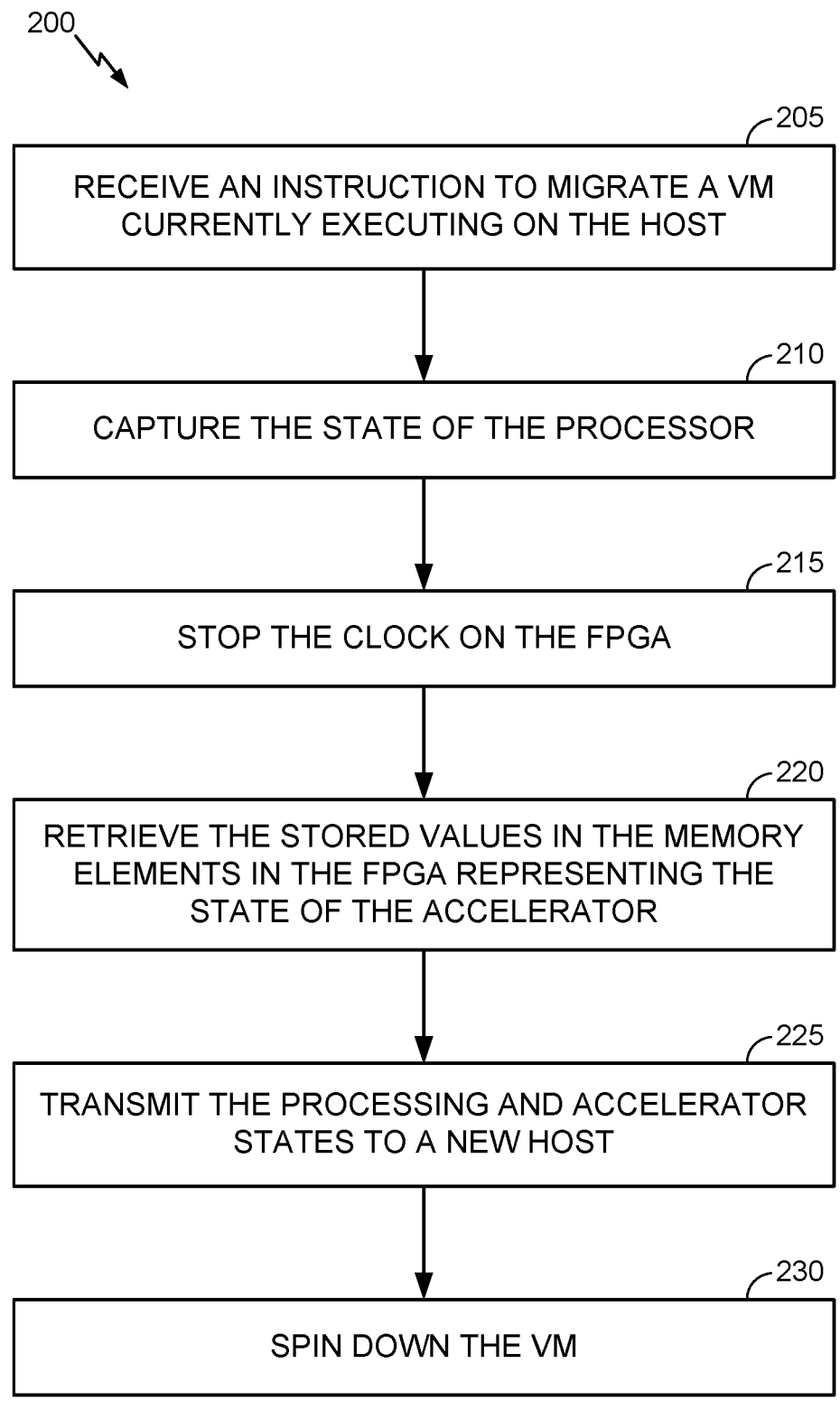
FIG. 2 is a flowchart of saving the state of an accelerator in a FPGA, according to an example.

FIG. 2 is a flowchart of a method 200 for saving the state of an accelerator in a FPGA, according to an example. The method 200 begins at block 205 where a host receives an instruction to migrate a VM currently executing on the host. In one embodiment, the instruction is transmitted by a central controller in a data center. For example, the current host may not have sufficient hardware to execute the VM. In response, the central controller migrates the VM to a host that has sufficient available processing power or memory to execute the VM. Alternatively, the central controller may need to perform maintenance on the current host (e.g., update the firmware or replace a faulty hardware component) but before doing so, migrates the VM (or VMs) currently executing on the host to a different host using the techniques described below.

At block 210, the migration tool on the current host captures the state of the processor. For example, the migration tool may save the state of the registers and the other memory elements in the processor thereby preserving the state of the applications executing in the VM.

At block 215, the migration tool stops the clock on the FPGA in the host. In one embodiment, the FPGA includes programmable logic configured to execute an accelerator which the host uses to perform specialized tasks issued by the VM.

Figure 3:
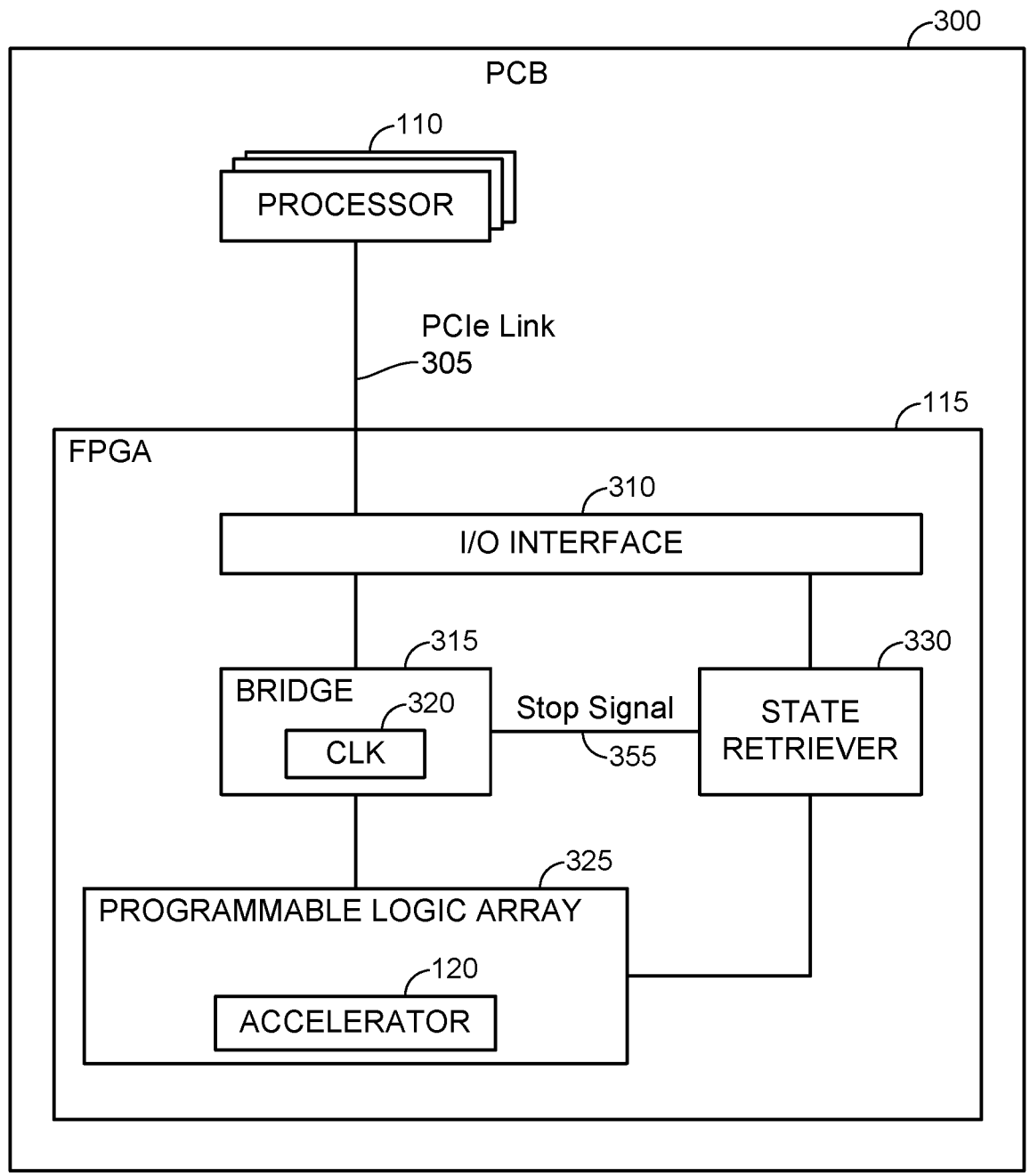
FIG. 3 illustrates a computing system for saving a state of a FPGA according to an example.

FIG. 3 illustrates a computing system for saving a state of a FPGA 115 according to an example. FIG. 3 includes a printed circuit board (PCB) 300 on which the processors 110 and the FPGA 115 are mounted. For example, the PCB 300 may be a motherboard that includes a PCIe link 305 that communicatively couples the processors 110 to the FPGA 115.

The FPGA 115 includes an input/output (I/O) interface 310 coupled to the PCIe link 305 to transmit data between the FPGA 115 and the processors 110. Further, the FPGA 115 includes a bridge 315 coupled between the I/O interface 310 and programmable logic array 325 that includes a plurality of programmable logic blocks. These blocks are coupled via reconfigurable interconnects that permit the logic blocks to be wired together in different configurations. In this instance, the programmable logic array 325 is programmed to implement the accelerator 120.

The bridge 315 controls a clock 320 (or a clock generator) used to operate the programmable logic array 325 forming the accelerator 120. That is, the bridge 315 uses the clock 320 to drive the logic in the accelerator 120 to process data as described above. The bridge 315 can be specialized hardware in the FPGA that is not reconfigurable or formed from programmable logic. In one embodiment, the bridge receives a signal from the migration tool at block 210 of method 200 to stop the clock 320. In response, the bridge 315 stops the accelerator 120 by stop transmitting the clock 320 to the logic gates and memory elements in the array 325 forming the accelerator 120. Moreover, the bridge 315 terminates the PCIe communication between the processors 110 and the accelerator 120. In one embodiment, the bridge 315 informs the processors 110 that the FPGA 115 and the accelerator 120 are still present in the host, but are stopped. Put differently, the bridge 315 stops the clock (or clocks) to the programmable logic array 325 which pauses the accelerator 120 thereby maintaining the current state of the accelerator 120.

The FPGA 115 also includes a state retriever 330 which can be specialized (non-reconfigurable) hardware in the FPGA or can be formed from programmable logic. The state retriever 330 captures the state of the accelerator 120 and transmits the state to the processors 110 via the PCIe link 305. In one embodiment, the I/O interface 310 includes a multiplexer for selecting whether the data transmitted from the accelerator 120 or the state retriever 330 is transmitted on the PCIe link 305 (e.g., a shared link) to the processor 110. When the accelerator 120 is operating (i.e., the clock 320 is active), the I/O interface 310 couples the accelerator 120 to the PCIe link 305. However, if the clock 320 and the accelerator 120 are stopped, the I/O interface 310 couples the state retriever 330 to the PCIe link 305 thereby permitting the state retriever 330 to transmit accelerator state that includes the values stored in the flip flops and other memory elements in the accelerator 120 to the processor 110. While the embodiments described herein use the state retriever 330 to capture the state of the accelerator for migrating a VM, in other embodiments, the state information provided by the retriever 330 can be used for debugging the accelerator 120 or the FPGA.

Returning to method 200, at block 220, the migration tool retrieves the stored values in the memory elements in the FPGA representing the state of the accelerator. That is, once the clock is stopped, the state retriever can transmit the stored values of memory elements in the accelerator to the migration tool to form the accelerator state as described above.

At block 225, the migration tool transmits the processor and accelerator states to a new host (e.g., destination host 160 in FIG. 1), and at block 230, the host spins down the VM. For example, the host can invalidate the memory assigned the VM so that this memory can now be assigned to other VMs in the host or for other purposes. Moreover, the processors in the host no longer execute instructions for the VM, and thus, these compute resources can be assigned to other tasks or applications.

Figure 4:
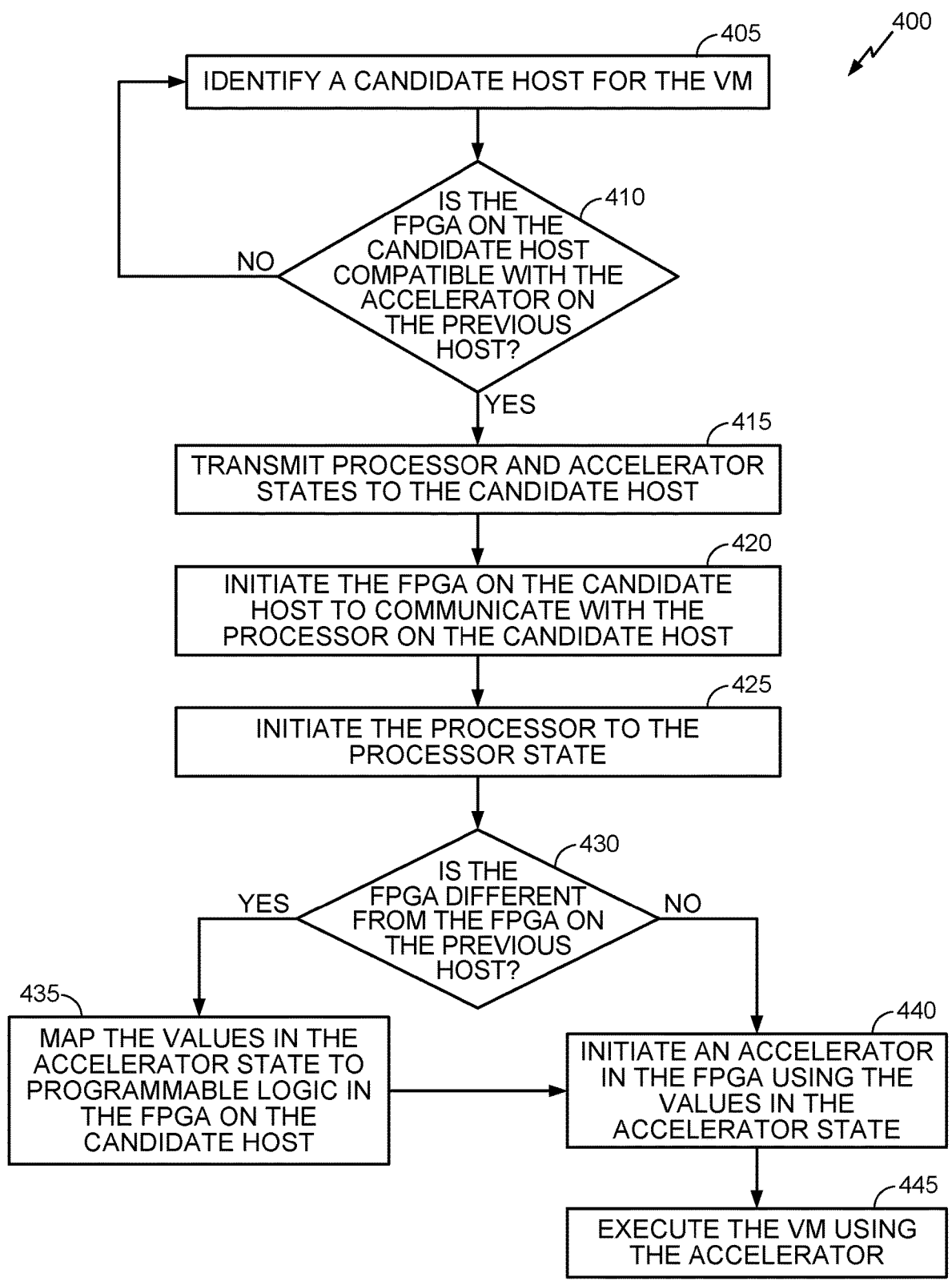
FIG. 4 is a flowchart of initializing an accelerator in a FPGA to a saved state according to an example.

FIG. 4 is a flowchart of a method 400 for initializing an accelerator in a FPGA to a saved state according to an example. The method 400 begins at block 405 where a migration manager (e.g., a central controller) in a data center identifies a candidate host for the VM. For example, the migration manager may determine which compute system will host the VMs.

Figure 5:
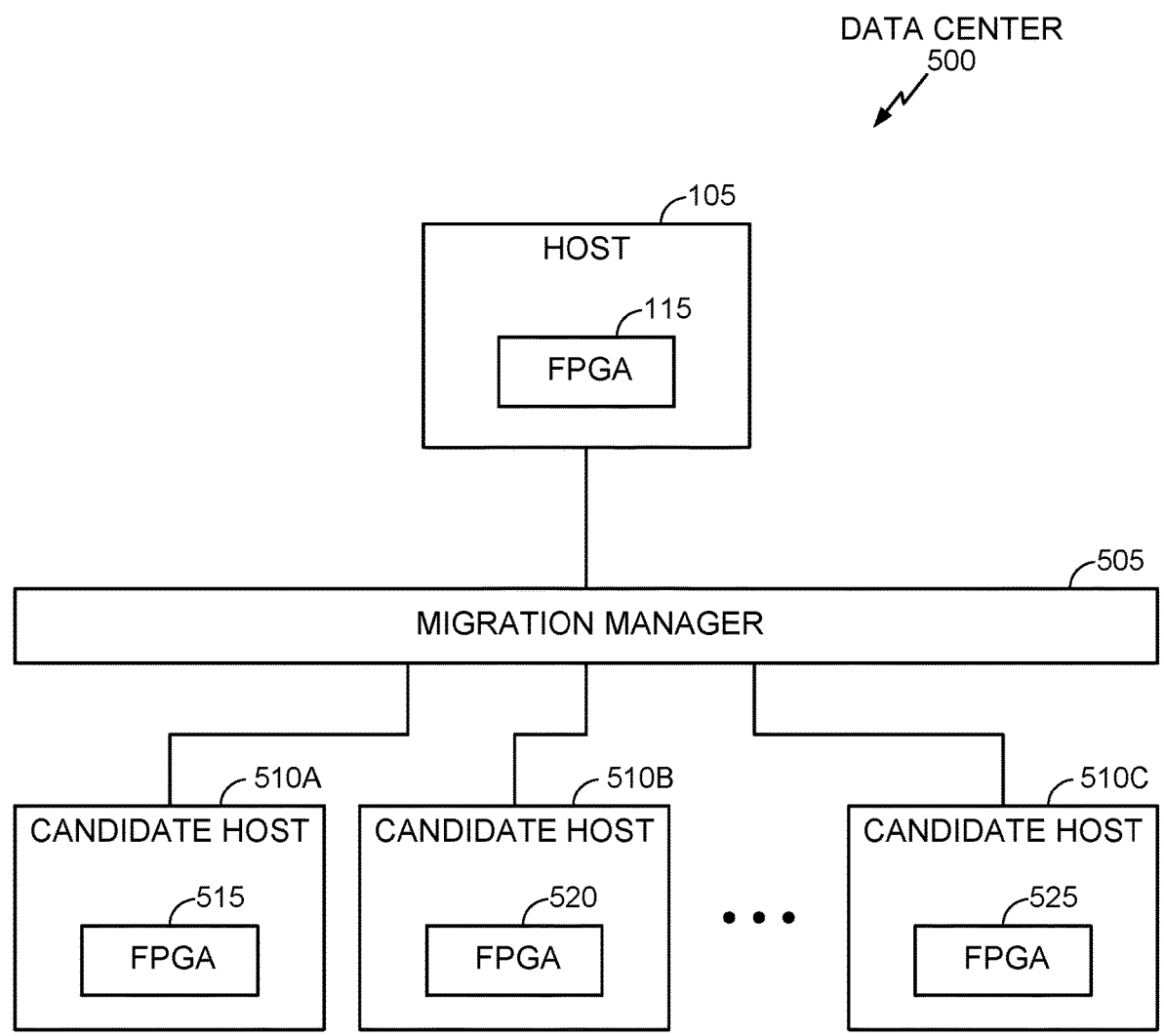
FIG. 5 illustrates a migration manager for selecting a candidate host for migrating a VM according to an example.

FIG. 5 illustrates a migration manager 505 for selecting a candidate host 510 for migrating a VM according to an example. As shown, the data center 500 includes the source host 105 in FIG. 1 which includes the FPGA 115. The migration manager 505 is communicatively coupled to the source host 105 and the candidate hosts 510. In one embodiment, the migration manager 505 monitors the performance metrics in the hosts 105, 510 such as the memory usage and processor utilization. For example, if the performance metrics for host 105 indicates the host 105 does not have sufficient compute resources to host the VM, the migration manager 505 can evaluate the performance metrics for the candidate hosts 510 to determine if these compute system have sufficient available resources for the VM. Alternatively, the data center 500 may migrate a VM executing on the host 105 because there was a hardware failure on the host 105 or the hardware or firmware is scheduled to be upgraded.

The migration manager 505 may execute on one of the hosts shown in FIG. 5 or may be a software application executing on a different compute system in the data center 500. In one embodiment, the migration manager 505 accepts user commands. For example, a system administrator may instruct the migration manager 505 to migrate the VM on host 105 to a candidate host 510. Moreover, the system administrator may change thresholds corresponding to the performance metrics that determine when the VMs are migrated between the hosts in the data center. For example, the system administrator may instruct the migration manager 505 to migrate a VM if the processor utilization is above 98% for over a minute.

In addition to evaluating performance metrics, the migration manager may determine if the candidate hosts 510 have specialized hardware that is compatible with the hardware in the host 105 that is currently executing the VM. For example, the FPGA 115 may include an accelerator as described above. However, only certain types of FPGAs may be able to execute the accelerator. Before migrating the VM, the migration manager 505 may determine whether the FPGAs 515, 520, and 525 are compatible with the accelerator on the FPGA 115. For example, the FPGA 515 may be compatible with the accelerator on FPGA 115 while the FPGAs 520 and 525 are not.

Returning to method 400, the migration manager determines if the FPGA on the candidate host is compatible with the accelerator on the previous host. The migration manager may first determine that the performance metrics on the candidate host indicate the host has sufficient available compute resources to execute the VM (e.g., processor utilization under 60%). If so, the migration manager determines if the FPGA on the candidate host is compatible with the accelerator on the current host. The migration manager may store information for each candidate host and the FPGAs in those hosts. After identifying the accelerator on the previous host, the migration manager can use the stored information to determine which FPGAs are compatible with the accelerator. An FPGA is compatible with the accelerator if the candidate host can configure its FPGA using the saved accelerator state from the previous host. Thus, the candidate host can resume the task on the accelerator on its FPGA without having to restart the task.

If the candidate host does not have a compatible FPGA, the method 400 returns to block 405 to identify another candidate host. However, if compatible, the method 400 proceeds to block 415 where the migration manager transmits the processor and accelerator states to the candidate host.

At block 420, the candidate host initializes its FPGA to communicate with the processor on the candidate host. In this example, the candidate host initializes the I/O interface in the FPGA which enables the FPGA to begin receiving and responding to instructions from the processor.

At block 425, the candidate host initializes the processor using the received processor state. As a result, the processor on the candidate host now is in the same state as the processor in the previous host when the VM was migrated. In one embodiment, the processor on the candidate host has the same register values as the processor in the previous host so that the processor on the candidate host can resume the migrated VM in the same state. That is, the operating system and applications can be executed on the candidate host in the same state as when they were executed in the previous host.

At block 430, the migration tool on the candidate host determines if the FPGA is different from the FPGA on the previous host. In one embodiment, the migration tool determines if the FPGA is the same type or has the same architecture (e.g., same product number or model number) as the FPGA on the previous host. If so, the method 400 proceeds to block 440 where the candidate host initializes an accelerator in the FPGA on the candidate host using the values in the accelerator state. Thus, the accelerator in the candidate host is in the same state of the accelerator in the previous host when the VM was migrated. As such, the accelerator in the FPGA on the candidate host can resume the task being executed on the accelerator on the previous host before the VM was migrated.

However, if the FPGA on the candidate host is different than the FPGA on the previous host, the method 400 proceeds to block 435 where the migration tool on the candidate host maps the values in the accelerator state to programmable logic in the FPGA on the candidate host. That is, even though the migration manager has already determined the FPGAs on the previous and candidate host are compatible at block 410, the migration tool performs the mapping in block 435 since the values in the accelerator state may correspond to different logic in the candidate host FPGA than the FPGA in the previous host. That is, because the FPGAs have different architectures (e.g., different programmable logic arrays), the mapping at block 435 permits the values in the accelerator state to be mapped to different logic in the FPGA in the candidate host.

Block 435 may be performed when the FPGA on the candidate host has the same type of accelerator operating, or when the FPGA has a different type of accelerator or no configured accelerator. As an example of the former, the destination FPGA may be different type of FPGA than the current FPGA, but both FPGAs may have the same type of accelerator (e.g., both have a graphics accelerator). In this case, the migration tool still maps the values in the accelerator state to the programmable logic in the FPGA on the candidate host since accelerator may be configured differently in the destination FPGA. If the destination FPGA has a different type of accelerator than the current FPGA (or no accelerator), the migration tool maps the values at block 435 and uses that mapping to configure a new accelerator and initialize that accelerator into the saved accelerator state.

FIG. 6 illustrates a mapping 600 of an accelerator to different FPGA architectures according to an example. In this embodiment, the mapping 600 is for a graphic accelerator which maps the values of different memory elements (e.g., registers or flip flops) to different FPGA architectures. For example, the first column in mapping 600 lists various registers in FPGA Type A. The second and third columns list corresponding registers in FPGAs Type B and Type C. For example, if the previous host had the FPGA Type A but the candidate host has the FPGA Type B, then the value of register X2, Y4 should be stored at register X1, Y5 in FPGA Type B. Put differently, if the accelerator state includes a value for register X2, Y4, when initializing the FPGA in the candidate host, the migration tool stores that value in register X1, Y5. In this manner, the migration tool can use the mapping 600 to convert and store the values in the accelerator state to memory elements in compatible FPGAs.

In one embodiment, the migration tool (or the migration manager for the data center) stores mappings 600 for the different accelerators used in the data center. For example, the migration tool may store mappings for all the accelerators that are compatible with the FPGAs in the host. Thus, whenever the migration tool receives an accelerator state derived from a different FPGA, the migration tool can save the registers values in the accelerator state into corresponding registers in the FPGA to initialize a local accelerator into the same state. However, as shown in the method 400, if the FPGAs are the same, then the values in the accelerator state can be saved into the FPGA without using the mapping 600—i.e., the method 400 can skip block 435.

At block 445, after the accelerator on the FPGA is initialized, the candidate host begins executing the VM. That is, the processor and accelerator are both initialized and the VM can be resumed in the same state as the accelerator was in the previous host.

While the foregoing is directed to specific examples, other and further examples may be devised without departing from the basic scope thereof, and the scope thereof is determined by the claims that follow.

What is claimed is:

1. A first computing system, comprising:
    a first processor and memory communicatively coupled to the first processor;
    a migration tool included in the memory that is configured to save a state of the first processor and a state of a first accelerator to migrate a virtual machine (VM) operating in the first computing system to a second computing system when a request to migrate the VM is received at the first computing system;
    a first programmable integrated circuit (IC); and
    a communication link between the first processor and the first programmable IC
    the first programmable IC comprising:
        a programmable logic array implementing the first accelerator using programmable logic;
        an input/output (I/O) interface configured to communicatively couple the first programmable IC to the communication link;
        a bridge communicatively coupled between the I/O interface and the programmable logic array, and wherein the bridge is separate from the I/O interface, wherein the bridge is configured to selectively stop a clock within the bridge that operates the programmable logic array thereby stopping execution of the first accelerator, and
        a state retriever configured to after the clock is stopped, retrieve the state of the first accelerator,
        wherein, in response to the request to migrate the VM, the migration tool is configured to:
            signal the bridge to stop the clock that operates the logic array;
            receive the state of the first accelerator from the state retriever after the clock is stopped over the communication link via the I/O interface; and
            transmit the state of the first processor and the state of the first accelerator to the second computing system, thereby migrating the VM to the second computing system.

2. The first computing system of claim 1, wherein the bridge is configured to output the clock to the first accelerator, wherein stopping the clock stops the first accelerator from executing.

3. The first computing system of claim 1, wherein the first accelerator is configured to execute a task for the VM, wherein the state of the first accelerator saves a status of the task after determining to migrate the VM.

4. The first computing system of claim 1, wherein the state of the first accelerator comprises respective saved values of a plurality of memory elements in the programmable logic implementing the first accelerator.

5. The first computing system of claim 1, comprising:
    a first compute system comprising the first processor and the first programmable IC, wherein the first compute system is configured to execute the VM; and
    a second compute system comprising a second processor and a second programmable IC, wherein the second compute system is configured to:
        receive the state of the first processor and the state of the first accelerator;
        initialize a second accelerator in the second programmable IC based on the state of the first accelerator;
        initialize the second processor based on the state of the first processor; and
        execute the VM in the second compute system after initializing the second processor and the second accelerator.

6. The first computing system of claim 5, upon determining the first programmable IC is not the same type as the second programmable IC, the first computing system is configured to:
    map a first memory element in the state of the first accelerator to a second memory element in the second programmable IC using a predefined mapping corresponding to the first accelerator, wherein the first memory element is disposed at a location in the first programmable IC that is different from a location in the second programmable IC containing the second memory element; and
    store a value of the first memory element in the state of the first accelerator to the second memory element in the second programmable IC.

7. A programmable integrated circuit (IC), comprising:
    an input/output (I/O) interface configured to communicatively couple the programmable IC to a communication link, the communication link coupled to an external processor within a first computing system;
    a programmable logic array implementing an accelerator configured to execute a task corresponding to a virtual machine (VM);
    a bridge communicatively coupled between the I/O interface and the programmable logic array, wherein the bridge is configured to, in response to a request to migrate the VM to a different computing system, selectively stop a clock within the bridge that operates the programmable logic array thereby stopping execution of the accelerator, wherein the bridge is separate from the I/O interface; and
    a state retriever configured to return a state of the accelerator over the communication link via the I/O interface after the clock has stopped, which is transmitted to a second computing system, thereby migrating the VM to the second computing system.

8. The programmable IC of claim 7, wherein the bridge is configured to output the clock to the accelerator, wherein stopping the clock stops the accelerator from executing.

9. The programmable IC of claim 7, wherein the state of the accelerator saves a status of the task after determining to migrate the VM, and wherein the state of the accelerator comprises respective saved values of a plurality of memory elements in the programmable logic array implementing the accelerator.

10. The programmable IC of claim 7, wherein the I/O interface comprises a multiplexer configured to select whether the accelerator or the state retriever can use a shared link between the I/O interface and the external processor.

11. A method for migrating a virtual machine (VM), the method comprising:

in response to a request to migrate the VM, retrieving a state of a first accelerator in a first programmable logic array in a first programmable integrated circuit (IC) by stopping a clock within a bridge that operates the first programmable logic array in the first programmable IC communicatively coupled between an I/O interface and the programmable logic array thereby stopping execution of the first accelerator, wherein the bridge is separate from the I/O interface, wherein the I/O interface communicatively couples the first programmable IC to a communication link, the communication link connected to an external processor, wherein the state of the first accelerator is retrieved over the communication link via the I/O interface, wherein the first accelerator executes a task for the VM, and wherein the first programmable IC is disposed in a first computing system;

transmitting the state of the first accelerator to a second computing system, thereby migrating the VM to the second computing system;

initializing a second accelerator in a second programmable logic array in a second programmable IC based on the state of the first accelerator, wherein the second programmable IC is disposed in the second computing system; and executing the VM in the second computing system after initializing the second accelerator in the second programmable IC.

12. The method of claim 11, wherein saving the state of the first accelerator comprises:

stopping a clock controlling the execution of the first accelerator in the first programmable IC upon determining to migrate the VM;

saving, after stopping the clock, the state of the first accelerator.

13. The method of claim 11, wherein the state of the first accelerator saves a status of the task upon determining to migrate the VM.

14. The method of claim 11, further comprising:

determining that the second programmable IC is compatible with the first accelerator executing on the first programmable IC, wherein the state of the first accelerator is transmitted to the second compute system only after determining the second programmable IC is compatible with the first accelerator.

15. The method of claim 11, further comprising:

capturing a state of a first processor in the first compute system in order to capture a state of the VM;

transmitting the state of the first processor to the second compute system;

initializing a second processor in the second compute system based on the state of the first processor; and executing the VM in the second compute system after initializing the second processor in the second compute system.

16. The method of claim 11, further comprising:

determining whether the first programmable IC is a same type as the second programmable IC.

17. The method of claim 16, further comprising, upon determining the first programmable IC is the same type as the second programmable IC:

saving a value of a first memory element in the state of the first accelerator to a second memory element in the second programmable IC, wherein the first and second memory elements are in a same location in the first and second programmable ICs.

18. The method of claim 16, further comprising, upon determining the first programmable IC is not the same type as the second programmable IC:

mapping a first memory element in the state of the first accelerator to a second memory element in the second programmable IC using a predefined mapping corresponding to the first accelerator, wherein the first memory element is disposed at a location in the first programmable IC that is different from a location in the second programmable IC containing the second memory element; and storing a value of the first memory element in the state of the first accelerator to the second memory element in the second programmable IC.

* * * * *

UNITED STATES PATENT AND TRADEMARK OFFICE
CERTIFICATE OF CORRECTION

PATENT NO. : 10,740,146 B2
APPLICATION NO. : 15/430231
DATED : August 11, 2020
INVENTOR(S) : Sundararajarao Mohan et al.

Page 1 of 1

It is certified that error appears in the above-identified patent and that said Letters Patent is hereby corrected as shown below:

In the Claims

Column 9, Line 31, In Claim 1, delete "IC" and insert -- IC, --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*